A. C. CHENOWETH.
APPARATUS FOR MAKING AND LAYING PROTECTIVE COVERINGS.
APPLICATION FILED JUNE 11, 1915.
1,359,575.
Patented Nov. 23, 1920.
3 SHEETS—SHEET 1.
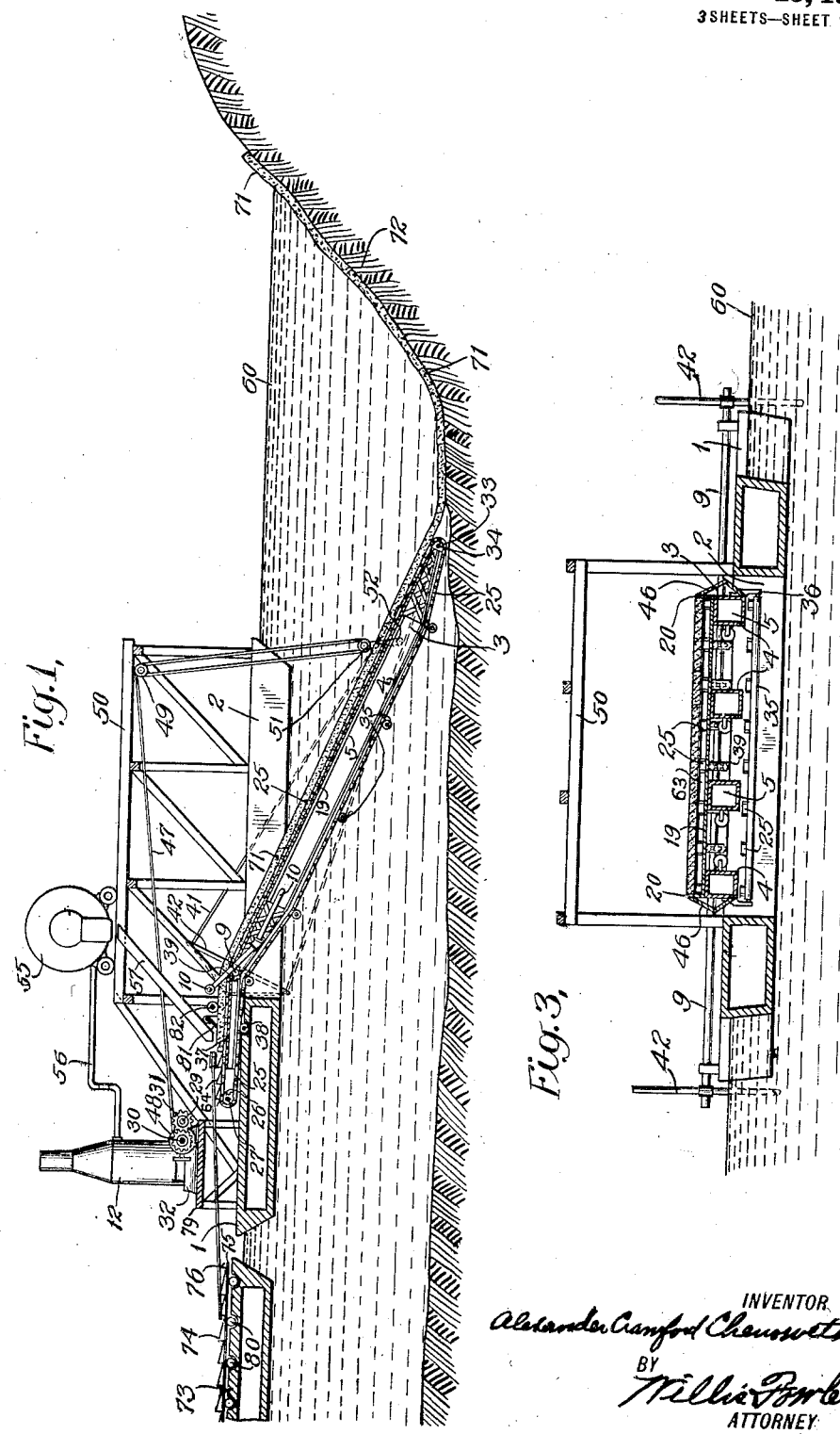
INVENTOR
Alexander Cranford Chenoweth
BY
Willis Fowler
ATTORNEY

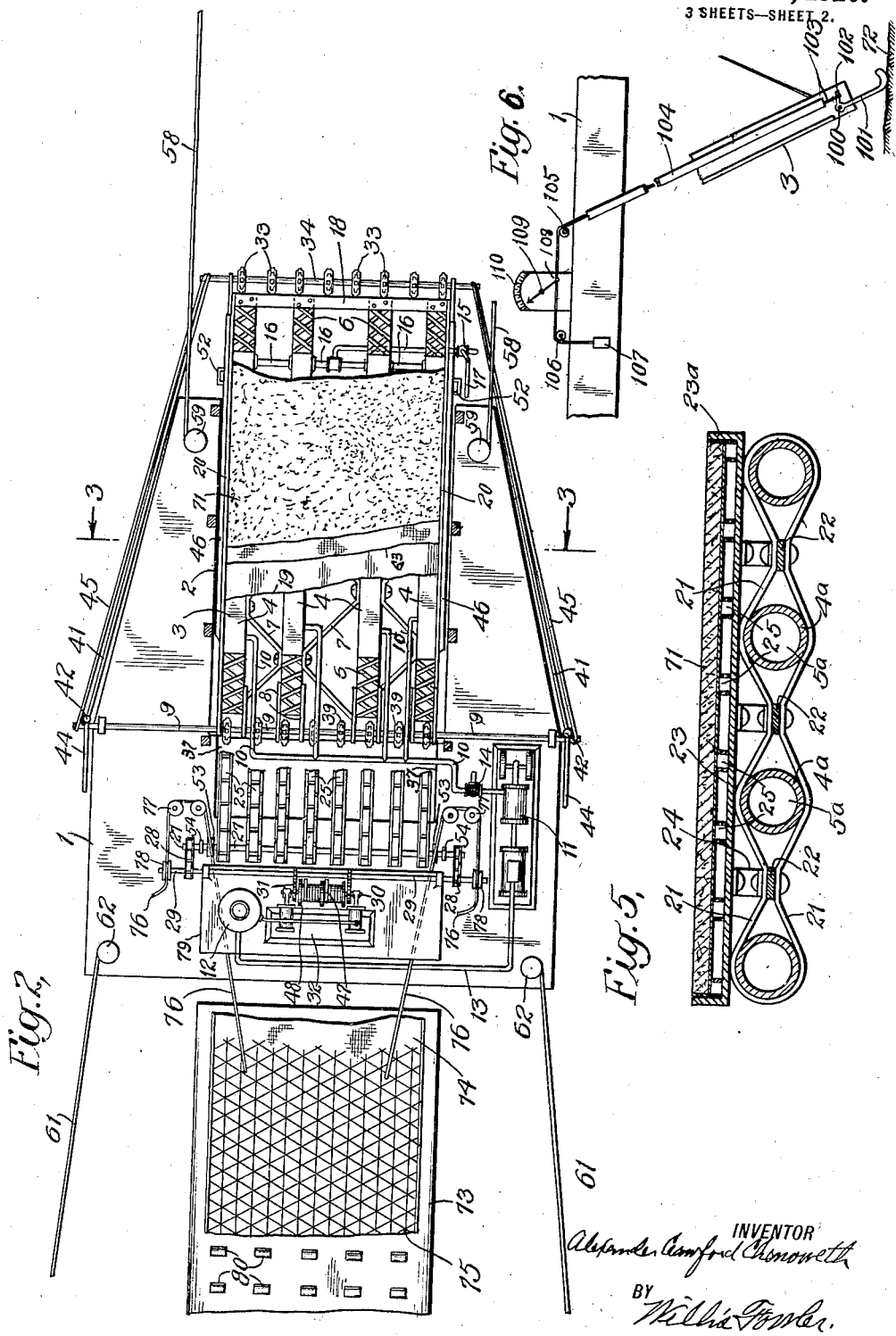

A. C. CHENOWETH.
APPARATUS FOR MAKING AND LAYING PROTECTIVE COVERINGS.
APPLICATION FILED JUNE 11, 1915.
1,359,575.
Patented Nov. 23, 1920.
3 SHEETS—SHEET 3.
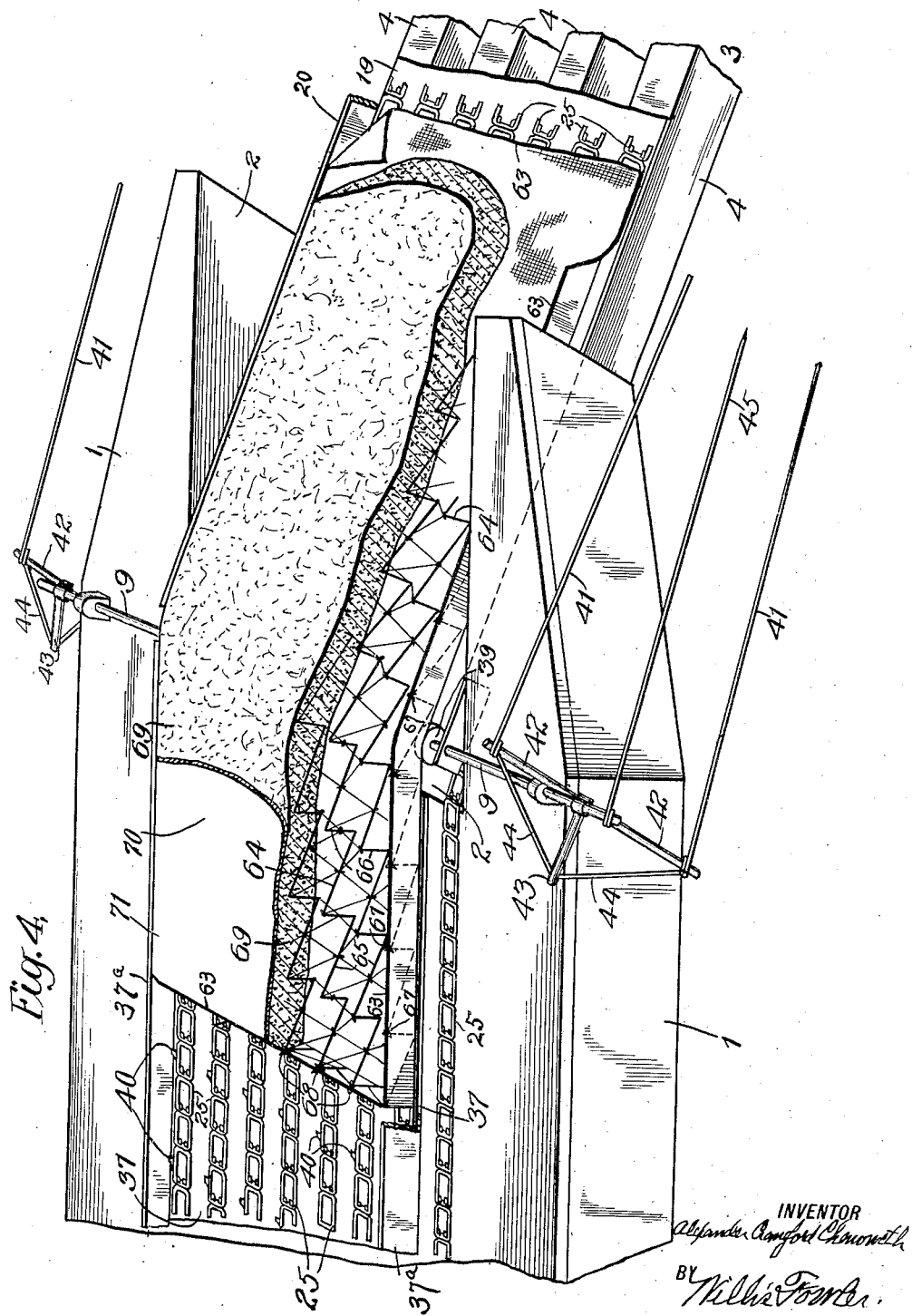

UNITED STATES PATENT OFFICE.

ALEXANDER CRAWFORD CHENOWETH, OF NEW YORK, N. Y.

APPARATUS FOR MAKING AND LAYING PROTECTIVE COVERINGS.

1,359,575.  Specification of Letters Patent.  Patented Nov. 23, 1920.

Application filed June 11, 1915. Serial No. 33,608.

*To all whom it may concern:*

Be it known that I, ALEXANDER CRAWFORD CHENOWETH, a citizen of the United States, residing in the city of New York, county and State of New York, have invented certain new and useful Improvements in Apparatus for Making and Laying Protective Coverings, of which the following is a specification.

My invention relates to improved apparatus for making protective reinforced concrete coverings and laying the same upon the surface to be protected from erosion, and also to the method of reclaiming submerged land and forming bulkheads by the use of such coverings. While the invention has particular reference to coverings formed of a flexible body of plastic cement material having flexible reinforcing means embedded therein and which are laid in plastic unset state upon the surface to be protected, it is also applicable to other forms of protective coverings.

My present invention consists in the various novel and peculiar arrangements and combinations of the different parts of the apparatus, as well as to the method of reclaiming submerged land and forming bulkheads by means of the protective coverings, all as hereinafter fully set forth and then pointed out in the claims.

I have illustrated types of my inventions, in the accompanying drawings, wherein:—

Figure 1, is a central vertical sectional view of the apparatus shown as floating in the water, near the shore, and with one of my improved coverings laid in final position on the shore and river bed, an extension of said section of the covering being on the apparatus with the rear end of said section in the course of construction.

Fig. 2, is a top plan view of the apparatus shown in Fig. 1, with the protective covering partly broken away to show the subjacent parts, and also showing the shore cables for securing the barge in place.

Fig. 3, is a transverse vertical section of the apparatus with the swinging apron raised into horizontal position, the plane of the section being indicated by line 3—3, Fig. 2, and looking in the direction of the arrows adjacent said line.

Fig. 4, is an enlarged perspective view of part of the barge and the swinging-apron mounted thereon, and with a protective covering on said barge and apron and shown as partly broken away.

Fig. 5, is an enlarged transverse section of another form of construction of the swinging-apron.

Fig. 6 shows a ground indicator.

Referring to the drawings, in which like numbers of reference designated like parts throughout, 1, is a float or barge in which is formed a large lateral recess 2, for the reception of the swinging-apron 3, the inner end of which is mounted on the barge while the outer end is free to be raised into a position that is substantially horizontal or lowered into the water at any desired degree of inclination and it may assume a vertical position if desired. In practice when laying the covering in deep water, the apron is usually adjusted at an angle of about seventy degrees. The recess 2, in the barge is made in the deck and also the hull, so that in effect the structure is a forked barge with the swinging-apron operating between the forked ends and this arrangement provides increased buoyancy.

The swinging-apron 3 is composed of suitably spaced longitudinally extending metal beams 4, each having the main part thereof made hollow so as to form an air-tight chamber 5, while the respective ends are braced by iron lattice work 6, in a manner well known, while the beams are connected together by the brackets 7. The inner end of the beams 4, are each provided on opposite sides with eyed bars or plates 8, (see Fig. 2) through the eyes of which passes loosely the horizontal hinge shaft 9, so that the apron swings freely on such shaft. Each air chamber 5, is connected with an air supply pipe 10, which is supplied with air under pressure by the air-pump 11, mounted on the barge-deck, the pump being supplied with steam for operating it from the boiler 12, by means of the connecting pipe 13. When the apron is to be raised it is made buoyant by operating the air-pump and filling the air-chambers 5, and this will relieve the structure of the dead weight of the apron, which when made forty feet wide by eighty feet long has considerable weight to it.

When the apron is to be depressed in the water it is desirable to discharge the air from the several chambers and this is accomplished by means of a hand-operated vent or valve 14, located in the air-pipe 10, at the same time admitting water to the air-chambers by way of the hand-operated water valve 15, and the pipe connections 16, the valve 15 being provided with a suitable pull-rod 17, which extends to a convenient point on the barge deck from where it can be manipulated by the operator.

The outer ends of the beams 4, are secured together by a crosspiece 18, and a sheet metal plate 19, is secured upon the upper sides of the beams to form a floor or surface beneath the conveyer which passes over the apron, and at each side of the apron is provided a rail or guide 20, for guiding the covering as it is moved over the apron by the conveyer.

In Fig. 5, I show a modified form of the apron 3 in which the longitudinal members are in the form of cylindrical tubes 4ª, having air chambers 5ª. These tubes are held together laterally by means of suitable cross-pieces 21, extending above and below the set of tubes and these cross pieces are bent in toward each other between the tubes where they are secured to an interposed bar 22. A sheet metal plate 23, is placed upon the upper sides of the tubes and is supported thereby and also by extra pieces 24, which are secured to the cross-pieces 21, at their depressed points. The side edges of the plate 23, are upturned so as to form guides 23ª, for the covering as it is conveyed over the apron.

A series of endless sprocket-chains 25, are arranged to pass around sprocket-wheels 26, which are turned by shaft 27, mounted on the barge deck, and which is driven through gearing 28, by the counter-shaft 29, which latter is actuated by the drive shaft 30, through means of gears 31. The steam engine 32, which is supplied with steam by the boiler 12, serves to operate the drive shaft 30.

The upper stretch of each conveyer chain 25 passes from its driving sprocket wheel 26, above the platform, thence over the upper side of the apron 3, around its outer end which is provided with a set of idle sprocket-wheels 33, mounted on a shaft 34, fixed across said end of the apron. The lower stretches of the chains pass thence under the apron and between the inner end thereof and the edge of the deck to the driving sprocket wheels 26. The lower stretches of the chains are sustained and guided by revolving carriers or rollers 35, which are suitably mounted across the underside of the apron in hangers 36, which depend from the apron, see Fig. 3. Beneath the upper stretches of the parts of the endless chains 25, which extend over the deck is fixed a sheet metal plate 37, similar to the plate 19, on the apron, so that the two plates together form a practically continuous imperforate flooring for the upper stretches of the chains to operate over and to rest on when the reinforced plastic concrete is being formed thereon into the completed covering. This particular arrangement permits of the covering of plastic concrete with its reinforce being built up directly on the chains which are then held at rest and which are, upon completion of the covering, operated to move it along while in plastic unset state and carry it down the apron from the outer end of which the covering is gradually deposited broad side on the ground beneath the end of the apron. A carrier 38, is also mounted on the deck for sustaining the lower stretches of the endless chains. See Fig. 1.

In order to guide the endless chains over the inner end of the apron, I provide a set of idle sprocket wheels 39, which are mounted loosely on the hinge-shaft 9, of the apron and the upper stretches of the chains pass over these sprockets.

The endless chains 25, have some of their links provided with outwardly projecting lugs or teeth 40, (see Fig. 4) which are adapted to take hold of the under side of the covering and compel it to move in concert with the chains when they are moved and this serves to feed the superimposed covering forwardly with positive action and at the same time the lugs do not mutilate the part of the covering with which they come in contact.

The swinging-apron 5, is braced at its respective sides by means of guys 41, which extend from the radial arms 42, mounted on the outer and prolonged ends of the hinge-shaft 9, to the outer ends of the sprocket-shaft 34, at the outer end of the apron. The arms 42, are disposed a considerable distance from the sides of the apron, so that the guys 41, run toward the outer end of the apron at a pronounced angle and thereby provide a substantial bracing effect. These arms 42, are braced in the rear by means of another arm 43, secured to the same part as the arms 42, and the rods or cables 44.

The guys 41, also extend at an angle to the plane of the apron as they are attached to points on the arms 42, a considerable distance above and below the level of the shaft and they serve to prevent torque.

In order to brace the apron against the surging effect of the water against the side edges of the apron, I provide at each side of the apron a surge guy 45, which extends from the outer end of the apron, to the extreme end of the shaft 9, and lies in the same plane as the apron. For convenience all of the guy members are attached to the ends of the sprocket shaft 34, at the outer end of the apron.

The flow of water against the side edges of the swinging apron 3, is turned and its pressure lessened, by forming the outer faces of the sides with a bevel or pointed rib 46, as shown more particularly in Fig. 3.

The hinge shaft 9, is placed somewhat above the level of the deck and slightly forward of the rear edge of the recess 2, formed in the barge, and this affords ample clearance for the lower stretches of the endless chains which pass between the shaft and the edge of the recess. The sprocket shaft 27, is shown as arranged slightly above the level of the hinge shaft 9, which carries the sprockets 39, and this gives a downward pitch to the portions of the chains lying over the platform and this tends to facilitate the forward feeding of the superimposed covering by the chains.

The apron with its superimposed load, is raised and lowered into the desired position by means of a rope 47, which passes from the winding drum 48, on the drive-shaft 30, to the pulley 49, fixed upon the frame work 50, extending above the deck and spanning the apron and the recess in which it operates. From the pulley 49, the hoisting rope extends to the pulley 51, attached to a swinging yoke 52, on the apron and thence back to the pulley 49, where it is secured. Thus the apron with its load is operated by the engine 32, above referred to.

The driving of the endless chains and bringing them to rest is controlled by a clutch 53, near each end of the sprocket shaft 27, and there is also provided a brake 54, near each end of the shaft. By operating the clutches the chains may be driven or held at rest, as desired. See Fig. 2.

The concrete mixer 55, is mounted above the deck on the super-structure 50, and it is driven by its engine, in the usual manner, the engine being supplied with steam from the boiler 12, by means of a connecting pipe 56. A supply chute 57, leads from the mixer down to a convenient point on the deck and above the level of the upper stretches of the conveyer chains 25. Similar chutes may be provided for supplying the concrete to desired places on the apron in building up the concrete covering.

In operating the apparatus, the barge 1, may be held fast to the shore by means of cables 58, connected with the posts 59, on the barge and anchored on shore, see Fig. 2. The rear end of the barge may be likewise held fast in relation to some fixed object in the body of water 60, by means of cables 61, which are connected to the posts 62, on the barge and extend to said fixed object in the water but which is not herein shown. Having thus positioned the barge, the apron 3 is brought into substantially horizontal position with the conveyer chains at rest. A large piece of suitable fabric 63, such as burlaps of a greater width than the apron and the length of the chains is placed directly on the chains and on this is laid a sheet of bent wire netting 64, of narrower width than the burlaps and so as to cover the length of the same. This netting has a triangular mesh and it is bent in parallel ridges, as indicated in the drawings, with a long stretch 65 running at an angle to the horizontal and a short stretch 66, that is normal. This provides a strong flexible reinforce that is flexible in parallel lines and transverse to the direction in which the covering is fed by the apparatus. The straight or normal stretches 66, may be about four inches and they practically determine the thickness of the completed covering. The burlap is brought up on each side of the bent netting and is tied to he high points thereof as indicated at 67, in Fig. 4. The same thing is done at the extreme end of the end of the covering when the final length of covering has been made, as shown at 68. This arrangement provides practically a tray like structure into which the plastic cement material 69, may be deposited so as to embed the bent wire netting. The concrete supplied from the mixer is spread over the entire section of netting and burlaps and is rammed down and leveled off while in unset state. After the entire section of covering is thus formed, I protect the upper surface thereof with a coating 70, made of semi-liquid clay, which may be applied with a broom.

When the covering 71, is thus completed and while still in plastic unset state, the apron is lowered to the desired angle and the endless chains are put in motion, so that the covering is fed forwardly and delivered from the outer end of the apron while plastic and in unset state and in this pliable condition it is applied to its ultimate place on the surface 72, that is to be protected from erosion. In this condition the covering will shape itself to the general contour of the surface upon which it is deposited. In Fig. 1, the covering is shown as first applied to the banks of the body of water and then continuing on down along the bed. After the first section of the covering is made on the full length of the chains and is moved by the same until the rear end remains a short distance out of the water, another section of covering is then at once built on to the rear end and the new section then fed forward, and so on until the desired length of covering is reached, the barge being moved a short distance rearwardly each time a new portion of the built up length of covering is laid on the ground. In the drawings herein, I have shown the endless chains as extending only a comparatively short distance on the deck, but this distance should be preferably greater and may be readily obtained by making the aft deck of the barge longer.

In order to expedite the building on of the rearward section of covering after the covering has been fed forward a suitable distance, I provide a second barge or float 73, to the rear of the first barge 1, and close thereto and on this I do the preparatory work of preparing the sheet of burlaps 74, and placing thereon the sheet of bent wire netting reinforce 75, so that these two parts when needed may be quickly drawn forward to the cables 76, which pass around guide pulleys 77, with the free end capable of being passed temporarily around a drum 78, fixed on the counter shaft 29. By holding the free ends of the cables after thus being passed around the drums, the cables will act to draw forward the burlaps and netting and bring them up to the endless chain 25, so that it can then be moved by hand further forward into the desired position on the chains and ready to receive the concrete. The deck of the barge 73, is provided with rollers 80, for reducing the friction of the burlaps and wire netting when hauled over the deck.

The boiler 12 and the steam engine 32, as well as the cable drum 48, are conveniently placed on a platform 79, which is raised a suitable distance above the barge deck to permit the free passage beneath it, of the burlaps and bent wire section when it is being hauled forward by the cables 76.

I also provide a swinging scraper 81, which is mounted above the series of endless chains on the barge deck and which serves to scrape the top of the concrete mass as it is moved along. A smoothing roller 82, is placed forward of the scraper and acts upon the concrete after passing the scraper.

While I have described my present improvements in connection with flexible reinforced coverings of plastic cement material which are laid in place while in unset state, nevertheless the apparatus herein set forth and claimed may be employed to lay protective coverings which are not in the green state but have been allowed to harden or set before being installed on the surface to be protected.

I wish to be understood as not limiting my invention to the particular construction of the various different parts herein shown, as it is evident that various modifications may be made in the different parts, without, however, departing from the spirit of my invention.

In practice I make the coverings about four inches thick and of ordinary concrete composed of sand, stone and hydraulic cement, properly proportioned and mixed in a manner well known, so that it will harden under water in which it is submerged. In my present work, I make the plastic covering about forty feet wide by eighty feet or more in length so that each covering before it is extended by progressive building on to its rear end, forms a monolithic section of substantial size.

In Fig. 6 I show a device for indicating the distance between the outer end of the apron and the river bottom 72. To a point 70 100, on the side of the apron 3, I pivot an arm 101, having its lower end weighted and its upper end provided with a fixed projection 102, to which is connected a wire 103, which passes upwardly through a protecting tube 104, to the deck of the barge 1, and runs over two pulleys 105, 106. The end of the wire is provided with a weight 107, and to a suitable point on the wire I attach the lower end of an index hand 108, which is pivoted at 109, on a dial having a graduated scale 110. The foot of the pivoted arm 101, coming in contact with the ground 72, is tilted and actuates the wire 103, so as to move the index hand over the scale which is graduated in inches and thereby indicates the distance of the end of the apron from the ground, the length of the pivoted arm being in proportion to the scale.

Having thus described my invention, what I claim and desire to secure by Letters Patent is;—

1. In apparatus for laying protective coverings on the surface to be protected, the combination of a platform and an apron adjustable in different angular positions relatively to the platform and both being provided with conveying means for positively engaging said covering and moving it from the platform and apron and upon which means the covering may be constructed.

2. In apparatus for laying protective coverings on the surface to be protected, the combination of a platform and an apron adjustable in different angular positions relatively to the platform and both being provided with conveying means for positively engaging said covering and moving it from the platform and apron and upon which means the covering may be constructed, the said platform and its conveying means being adapted to have made thereon a section of said covering while the apron and its conveyer are in a depressed position for depositing the covering carried thereby.

3. In apparatus for laying protective coverings on a subaqueous surface, a platform adapted for making thereon the covering, adjustable mechanism for receiving and supporting the covering, means for lowering and raising said mechanism to deposit the covering, the said mechanism being provided with means for retaining air or water and having means for expelling the one and introducing the other and vice versa.

4. In apparatus for laying protective coverings on a subaqueous surface, a platform adapted for making thereon the covering, adjustable mechanism for receiving and supporting the covering, means for lowering and raising said mechanism to deposit the covering, the said mechanism being provided with means for retaining air or water and having means for expelling the one and introducing the other and vice versa, and said mechanism having conveying means for moving the covering supported thereby.

5. In apparatus for laying protective coverings on a subaqueous surface, a platform adapted for making thereon the covering, adjustable mechanism for receiving and supporting the covering and comprising a set of spaced longitudinally extending members secured together and one or more of said members having air and water-tight compartments, means for expelling the air from said compartment and introducing water and vice versa, and means for lowering and raising the said mechanism to deposit the covering.

6. In apparatus for laying protective coverings on the surface to be protected, the combination of a platform and an apron adjustable in different angular positions relatively to the platform, means for raising and lowering the apron, endless chain conveyers extending along said platform and thence over the adjustable apron and capable of being moved with said apron in its adjustments, and means for driving said chains.

7. In apparatus for laying protective coverings on the surface to be protected, the combination of a platform and an apron adjustable in different angular positions, means for raising and lowering the apron, a driven shaft mounted on said platform and provided with sprocket-wheels, a set of sprocket-wheels mounted to turn on an axis coincident with the axis on which said apron swings, a shaft provided with sprocket-wheels and mounted at the outer end of said apron, endless chains passing around the sprocket-wheels on the driven-shaft and at the end of the apron and passing over said sprocket-wheels having their axes coincident with axis of motion of said apron.

8. In apparatus for laying protective coverings on the surface to be protected, the combination of a platform and an adjustable apron coöperating therewith, means for lowering and raising said apron a conveyer extending along said platform in substantially horizontal position and thence over said apron and responding to the movements of said apron, means for driving said conveyer so as to feed the superimposed covering along said platform and thence over the apron onto to the surface to be covered, said conveyer being adapted to have constructed directly thereon a flexible plastic reinforced protective covering of cement material capable of hardening, and a second platform near the said first one and on which certain parts of the covering may be prepared and then shifted onto said conveyer to be there completed.

9. In apparatus for laying protective coverings on the surface to be protected, the combination of a platform and an adjustable apron coöperating therewith, means for lowering and raising said apron, a conveyer extending along said platform in substantially horizontal position and thence over said apron and responding to the movements of said apron, means for driving said conveyer so as to feed the superimposed covering along said platform and thence over the apron onto the surface to be covered, said conveyer being adapted to have constructed directly thereon a flexible plastic reinforced protective covering of cement material capable of hardening, and a second platform near the said first one and on which certain parts of the covering may be prepared and then shifted onto said conveyer to be there completed, and hauling cables actuated by said driving means and adapted to be detachably connected with the assembled parts on said second platform for hauling the parts onto said conveyer.

10. In apparatus for laying protective coverings on the surface to be protected, the combination of a platform and an adjustable apron coöperating therewith, means for lowering and raising said apron, a conveyer extending along said platform in substantially horizontal position and thence over said apron and responding to the movements of said apron, means for driving said conveyer so as to feed the superimposed covering along said platform and thence over the apron onto the surface to be covered, said conveyer being adapted to have constructed directly thereon a flexible plastic reinforced protective covering of cement material capable of hardening, and a second platform near the said first one and on which certain parts of the covering may be prepared and then shifted onto said conveyer to be there completed, a bridge on said first mentioned platform between said conveyer and the said second mentioned platform, a motor located on said bridge for actuating said driving-means of the conveyer, and hauling members actuated by said driving-means and adapted to be detachably connected with said assembled parts on said second mentioned platform for hauling the said parts onto said conveyer.

11. In apparatus for laying protective coverings on the surface to be protected, the combination of a platform and an adjustable apron coöperating therewith, means for lowering and raising said apron, a conveyer extending along said platform in substantially horizontal position and thence over said apron and responding to the movements of said apron, means for driving said conveyer so as to feed the superimposed covering along said platform and thence over the apron onto the surface to be covered, said conveyer being adapted to have constructed directly thereon a flexible plastic reinforced protective covering of cement material capable of hardening, a frame above said platform, a concrete mixer located on said frame and provided with driving means, and a chute leading from said mixer to a point above said conveyer on the platform for supplying the concrete thereto.

12. In apparatus for laying protective coverings on the surface to be protected, the combination of a platform adapted for making thereon the covering, a swinging apron mounted thereon for depositing the covering on the surface to be protected, means for raising and lowering the apron, and guy members extending from points near the axis of motion of the apron to the outer end of the apron and upon the respective sides thereof.

13. In apparatus for laying protective coverings on the surface to be protected, the combination of a platform adapted for making thereon the covering, a hinge-shaft mounted thereon and an apron swung from said shaft, means for raising and lowering said apron, and guy members connected with the respective ends of said shaft and the outer end of said apron.

14. In apparatus for laying protective coverings on subaqueous surfaces to be protected, floating mechanism adapted for making thereon the covering, a swinging apron for depositing the covering on said surface and mounted at its inner end on said mechanism a substantial distance from the front and rear ends thereof with an unobstructed space beneath said apron and so as to bring the center of gravity at or near the center of said floating mechanism to give the apparatus stable equilibrium.

15. In apparatus for laying protective coverings on subaqueous surfaces to be protected, floating mechanism having a main part adapted for making thereon the covering with oppositely arranged side sections extending forwardly in parallel spaced relation with an unobstructed space between and beneath them, a swinging apron for depositing said covering on said surface and mounted on said main part and swinging between said sections so as to stabilize the equilibrium of the apparatus.

16. In apparatus for laying protective coverings on the surface to be protected, the combination of a platform, an adjustable apron coöperating with said platform for depositing the covering on the surface to be protected, a movable member mounted on the outer end of said apron for engaging the said surface, an indicator on said platform, and connections between said indicator and member, whereby the distance of the outer end of said apron from said surface is shown by the indicator.

In testimony whereof, I have hereunto set my hand in the presence of the two subscribing witnesses.

ALEXANDER CRAWFORD CHENOWETH.

Witnesses:
　WILLIS FOWLER,
　FRANK V. LUDWIG.